(12) United States Patent
Morey et al.

(10) Patent No.: US 9,267,413 B2
(45) Date of Patent: Feb. 23, 2016

(54) EXHAUST SYSTEM FOR AN AGRICULTURAL VEHICLE

(71) Applicant: CNH America LLC, New Holland, PA (US)

(72) Inventors: Daniel Alan Morey, Mundelein, IL (US); Kain Knowles, Chicago, IL (US); Rajeshwar Reddy Adupala, Naperville, IL (US); Panos Tamamidis, Mount Prospect, IL (US); John William Campbell, St. Gallen (CH)

(73) Assignee: CNH Industrial America LLC, New Holland, PA (US)

( * ) Notice: Subject to any disclaimer, the term of this patent is extended or adjusted under 35 U.S.C. 154(b) by 129 days.

(21) Appl. No.: 13/919,735

(22) Filed: Jun. 17, 2013

(65) Prior Publication Data
US 2013/0340417 A1 Dec. 26, 2013

Related U.S. Application Data

(60) Provisional application No. 61/662,182, filed on Jun. 20, 2012.

(51) Int. Cl.
| F01N 3/02 | (2006.01) |
| F01N 3/36 | (2006.01) |
| B01F 5/04 | (2006.01) |
| B01F 5/06 | (2006.01) |
| B01F 3/04 | (2006.01) |
| F01N 3/10 | (2006.01) |
| F01N 3/20 | (2006.01) |
| B01F 5/00 | (2006.01) |

(52) U.S. Cl.
CPC .............. *F01N 3/36* (2013.01); *B01F 3/04049* (2013.01); *B01F 5/0451* (2013.01); *B01F 5/0648* (2013.01); *F01N 3/103* (2013.01); *F01N 3/208* (2013.01); *B01F 2005/0034* (2013.01); *F01N 2240/20* (2013.01); *F01N 2470/02* (2013.01); *F01N 2470/24* (2013.01); *F01N 2610/03* (2013.01); *F01N 2610/1453* (2013.01); *Y02T 10/24* (2013.01)

(58) Field of Classification Search
CPC ......... F01N 3/36; F01N 3/101; B01F 5/4051; B01F 5/0648; B01F 3/04049
USPC .......................................................... 60/317
See application file for complete search history.

(56) References Cited

U.S. PATENT DOCUMENTS

| 4,387,915 | A | * | 6/1983 | Adickes .......................... 285/330 |
| 4,969,537 | A | * | 11/1990 | Wagner et al. ................. 181/255 |
| 5,829,248 | A | * | 11/1998 | Clifton ............................ 60/286 |
| 6,722,123 | B2 | | 4/2004 | Liu et al. |
| 6,722,124 | B2 | * | 4/2004 | Pawson et al. ................... 60/286 |
| 6,941,749 | B1 | * | 9/2005 | Noirot .............................. 60/297 |
| 7,328,572 | B2 | | 2/2008 | McKinley et al. |
| 7,497,077 | B2 | | 3/2009 | Dodge et al. |
| 8,033,104 | B2 | | 10/2011 | Zhang |
| 2006/0191259 | A1 | * | 8/2006 | Nakagawa ....................... 60/299 |

(Continued)

*Primary Examiner* — Jason Shanske
(74) *Attorney, Agent, or Firm* — Sue C. Watson

(57) ABSTRACT

An exhaust system for an agricultural vehicle is provided that includes a mixer configured to receive a spray of diesel exhaust fluid along a longitudinal axis of the mixer and an exhaust flow along a direction cross-wise to the longitudinal axis of the mixer. Additionally, the mixer is configured to mix the diesel exhaust fluid with the exhaust gas. Furthermore, the mixer is configured to discharge the exhaust gas along the longitudinal axis of the mixer.

11 Claims, 8 Drawing Sheets

(56) References Cited

U.S. PATENT DOCUMENTS

| | | | |
|---|---|---|---|
| 2006/0218902 A1* | 10/2006 | Arellano et al. | 60/295 |
| 2007/0289294 A1 | 12/2007 | Werni et al. | |
| 2008/0282687 A1* | 11/2008 | Park et al. | 60/300 |
| 2009/0178391 A1* | 7/2009 | Parrish | 60/286 |
| 2010/0107612 A1 | 5/2010 | Yamazaki et al. | |
| 2010/0132345 A1* | 6/2010 | Solbrig et al. | 60/301 |
| 2010/0132348 A1 | 6/2010 | Kowada | |
| 2010/0199645 A1* | 8/2010 | Telford | 60/295 |
| 2011/0094206 A1 | 4/2011 | Liu et al. | |
| 2011/0113755 A1* | 5/2011 | Kim | 60/275 |
| 2011/0113759 A1* | 5/2011 | Tilinski et al. | 60/295 |
| 2011/0272888 A1* | 11/2011 | Irizzary et al. | 277/314 |

* cited by examiner

EXHAUST SYSTEM FOR AN AGRICULTURAL VEHICLE

CROSS REFERENCE TO RELATED APPLICATION

This application claims priority from and the benefit of U.S. Patent Provisional Application Ser. No. 61/662,182, entitled "EXHAUST SYSTEM FOR AN AGRICULTURAL VEHICLE", filed Jun. 20, 2012, which is hereby incorporated by reference in its entirety.

BACKGROUND

The present disclosure relates generally to agricultural vehicles with diesel engines, and more particularly, to an exhaust system configured to reduce emissions from the diesel engines.

Certain agricultural vehicles are powered by diesel engines, which burn diesel fuel and produce exhaust gas. The exhaust gas may include undesirable byproducts such as nitrogen oxides (NOx), carbon monoxide, and particulate material. Certain agricultural vehicles include an exhaust system that reduces the concentration of the undesired byproducts. Traditional exhaust systems may spray a diesel exhaust fluid (DEF) collinearly within the flow of exhaust or against the wall of a mixer. New government regulations have continually reduced the amount of acceptable concentrations of byproducts dispelled from agricultural vehicles, particularly in relation to NOx. The traditional exhaust systems may not be able to satisfy new or future regulatory limits. These new regulations urge more efficient methods of regulating exhaust gases while minimizing the packaging size of the exhaust system to reduce the impact on the design of the entire vehicle.

BRIEF DESCRIPTION

In one embodiment, an exhaust system for an agricultural vehicle includes a mixer. Additionally, the mixer comprises an outer conduit and an inner conduit. The outer conduit has a plurality of openings configured to receive a flow of exhaust gas along a longitudinal axis of the mixer. The inner conduit is configured to receive a spray of diesel exhaust fluid through a distal end of the inner conduit along the longitudinal axis of the mixer. Moreover, the outer conduit is disposed about the inner conduit and is configured to direct the flow of exhaust gas from the openings toward the distal end of the inner conduit to mix the spray of diesel exhaust gas with the exhaust gas. Furthermore, the inner conduit is configured to discharge the exhaust gas along the longitudinal axis of the mixer.

In another embodiment, an exhaust system for an agricultural vehicle includes a mixer. The mixer has a conduit and a plurality of openings. Moreover, the conduit has a wall and a cone disposed at a distal end of the wall. Additionally, the plurality of openings is disposed along the wall and the cone. Furthermore, the plurality of openings is configured to receive a flow of exhaust gas. The conduit is configured to receive a spray of diesel exhaust fluid along a longitudinal axis of the mixer, to receive the flow of exhaust gas along a direction cross-wise to the longitudinal axis of the mixer, to mix the diesel exhaust fluid with the exhaust gas, and to discharge the exhaust gas along the longitudinal axis of the mixer.

In another embodiment, an exhaust system for an agricultural vehicle includes a housing and a mixer. The housing is configured to receive a flow of exhaust gas. The mixer is configured to receive a spray of diesel exhaust fluid along a longitudinal axis of the mixer. Additionally, the mixer is configured to receive a flow of exhaust gas from the housing along a direction cross-wise to the longitudinal axis of the mixer. Furthermore, the mixer includes a conduit and a protrusion. The conduit has a flared portion at the distal end of the conduit. The protrusion has an opening and is positioned adjacent to the flared portion. Additionally, the protrusion extends from an interior of the housing into the flared portion to establish an annular orifice between the protrusion and the flared portion. Moreover, the flared portion is configured to receive the spray of diesel exhaust fluid through the opening, and to receive the flow of exhaust gas through the annular orifice. The conduit is configured to discharge the exhaust gas along the longitudinal axis of the mixer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
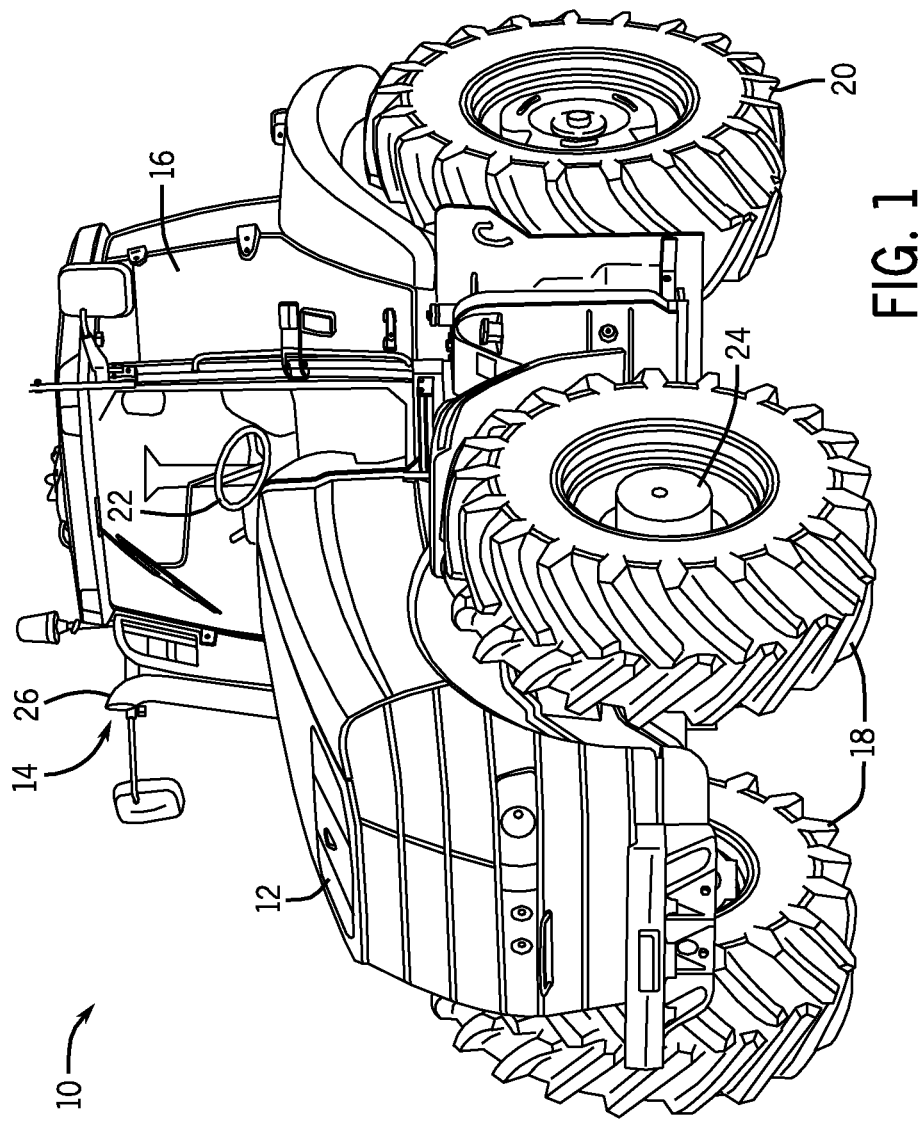
FIG. 1 is a perspective view of an embodiment of an agricultural work vehicle which employs an exhaust system for a diesel engine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of an agricultural vehicle. As regulations regarding exhaust emissions continue to become more stringent regarding the concentration of expelled byproducts (e.g., nitrogen oxides), manufacturers strive to produce more effective and efficient exhaust systems. Certain exhaust systems are configured to introduce a sprayed fluid (e.g., DEF) into the diesel exhaust. Some exhaust systems spray the DEF collinearly with the flow of exhaust, thereby creating a distribution of the DEF that is at least partially non-uniform. However, various embodiments of the present disclosure spray the DEF along the longitudinal axis of the mixer and cross-wise to the exhaust flow through the exhaust system to achieve a more effective mixture in which the DEF is more uniformly distributed. As discussed in detail below, the exhaust system of the present disclosure includes a mixer that mixes diesel exhaust with the DEF. Because the mixer provides a substantially uniform and efficient mixture of DEF and exhaust gas while maintaining a compact design, the mixer may achieve lower emissions than that of current mixers, such as the levels required by new or future regulations. Additionally, the efficient mixture of DEF allows the system to use less DEF, thereby reducing the cost required to operate the system. Further, because of the compact design, the mixer may be disposed within a housing of another exhaust system component (e.g., diesel oxidation catalyst housing or selective catalytic reduction module housing). Furthermore, various embodiments of the present disclosure reduce the amount of pressure drop (e.g., backpressure) across the exhaust system, thereby increasing the efficiency of the engine. The engine efficiency is increased by directing more of the engine's power to the use of the vehicle rather than siphoning power to force exhaust gas through the exhaust system. By increasing engine efficiency, the engine may provide more power to the work vehicle while consuming less fuel, thereby further decreasing emissions.

FIG. 1 is a perspective view of an embodiment of an agricultural work vehicle 10 which employs an exhaust system for a diesel engine. In certain embodiments, the agricultural work vehicle 10 may be a tractor, off-road vehicle, work vehicle, or any other suitable vehicle that may incorporate an exhaust system for a diesel engine. The illustrated vehicle 10 has a body 12 that houses an engine, transmission, cooling system, and power train (not separately shown). The body 12 also houses a portion of an exhaust system 14. Further, the agricultural work vehicle 10 has a cabin 16 where an operator may sit or stand to operate the vehicle 10. The vehicle 10 has two front wheels 18 and two rear wheels 20 that rotate to move the vehicle 10. As will be appreciated, the vehicle 10 is maneuvered using a steering wheel 22 that causes the front wheels 18 to turn. As illustrated, the wheels 18 are coupled to an axle 24 (e.g., fixed or suspended) that supports the wheels 18, and facilitates wheel rotation. As discussed in detail below, the exhaust system 14 may be routed around various systems within the body 12, such as a cooling system. The exhaust system 14 includes an exhaust pipe 26 which carries the exhaust gases away from the body, and directs the gases away from the cabin 16.

Figure 2:
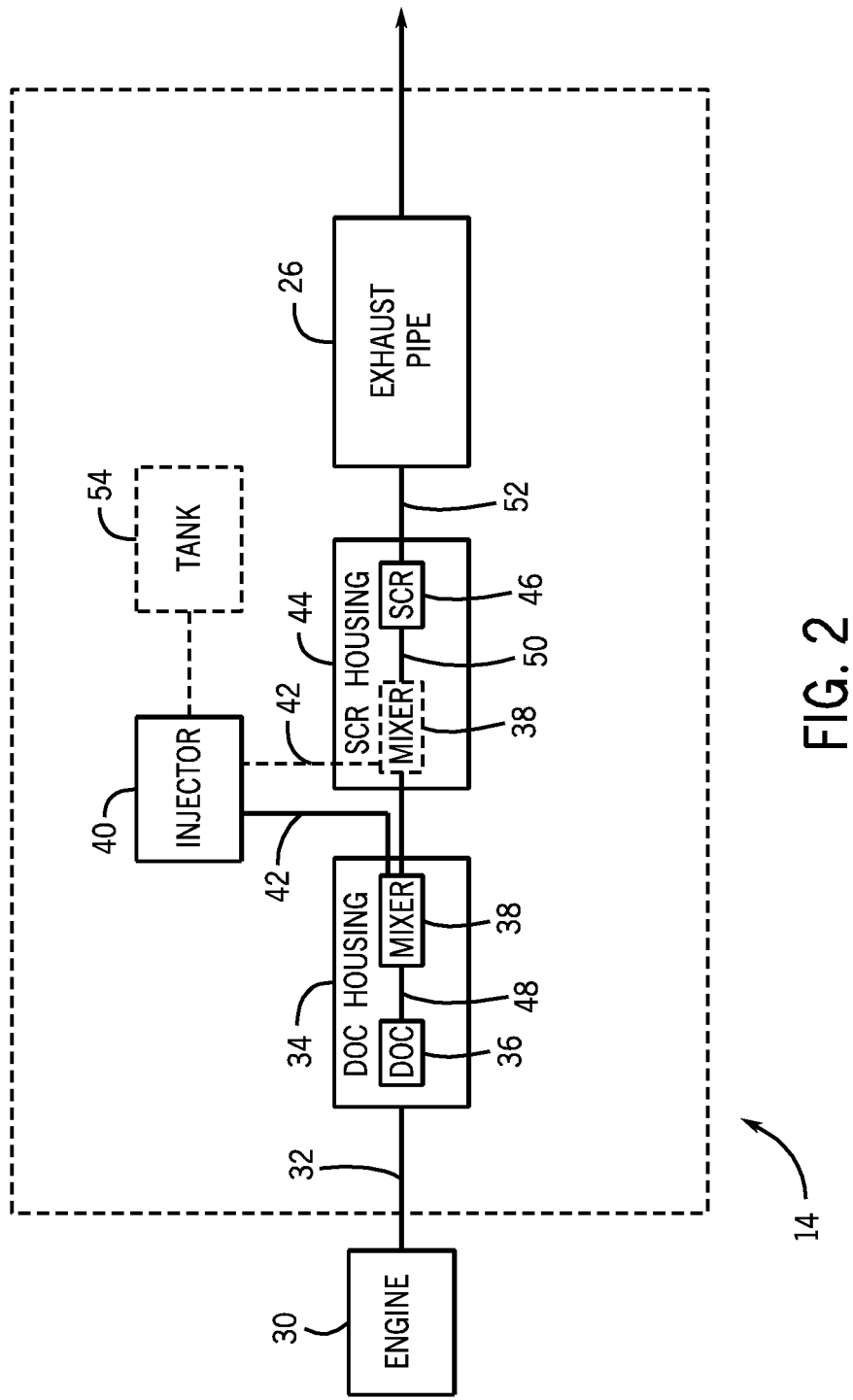
FIG. 2 is a schematic view of an embodiment of the exhaust system of FIG. 1.

FIG. 2 is a schematic view of an embodiment of the exhaust system of FIG. 1. In the illustrated embodiment, the engine 30 expels the exhaust 32 to the exhaust system 14. The illustrated embodiment of the exhaust system 14 includes a diesel oxidation catalyst (DOC) assembly having a housing 34 containing a DOC 36 and a mixer 38. The exhaust system 14 also includes an injector 40 for injecting diesel exhaust fluid (DEF) 42, a selective catalytic reduction (SCR) housing 44 containing an SCR module 46, and the exhaust pipe 26. In some embodiments, the mixer 38 may be disposed within the SCR housing 44 instead of, or in addition to, the DOC housing 34. Certain embodiments of the exhaust system 14 may additionally include a diesel particulate filter to capture particulate matter, a muffler, or any other element suitable for use in an exhaust system.

The DOC housing 34 receives exhaust 32, and directs the exhaust 32 into the DOC 36. As discussed in greater detail below, the DOC 36 receives the exhaust and catalyzes the oxidization of carbon monoxide to carbon dioxide by using excess oxygen in the exhaust 32. Similarly, the DOC 36 uses excess oxygen to catalyze the conversion of hydrocarbons to water and carbon dioxide. In certain embodiments, the DOC 36 may use ceramics, metals (e.g., platinum, palladium, etc.), or other suitable catalysts to catalyze the oxidization of the hydrocarbons and carbon monoxide molecules. Thus, the DOC 36 receives raw exhaust 32 and outputs catalyzed exhaust 48 with reduced concentrations of hydrocarbons and carbon monoxide. The DOC housing 34 directs the exhaust 48 to the mixer 38, which is enclosed within the DOC housing 34. The mixer 38 also receives the DEF 42 from the injector 40, in addition to the exhaust 48 from the DOC 36. In certain embodiments, the exhaust system 14 includes a tank 54 for containing the DEF 42, and supplying the DEF to the injector 40. Alternatively, the injector 40 may include a tank 54 containing DEF 42. In further embodiments, the tank 54 containing the DEF 42 may be remote from the injector 40. In certain embodiments, the mixer 38 may be disposed within SCR housing 44, a separate housing, or any other housing suitable for containing the mixer 38.

As discussed in greater detail below, the injector 40 sprays the DEF 42 into the exhaust 48 within the mixer 38. The DEF 42 is a solution used to aid in the reduction of NOx from the exhaust 48. For example, in certain embodiments, the DEF 42 may be an aqueous urea solution which undergoes thermal decomposition and hydrolysis within the exhaust system 14 to produce ammonia, which the SCR uses to convert the NOx into nitrogen and water. Thus, the mixer 38 supplies well-mixed exhaust solution 50 to the SCR module 46. The SCR module 46 receives the exhaust solution 50 and uses the distributed DEF 42 to reduce the NOx concentration in the exhaust gas. Finally, the SCR module 46 sends processed exhaust 52 with a reduced NOx concentration through the exhaust pipe 26 of FIG. 1 to be released into the atmosphere.

Figure 3:
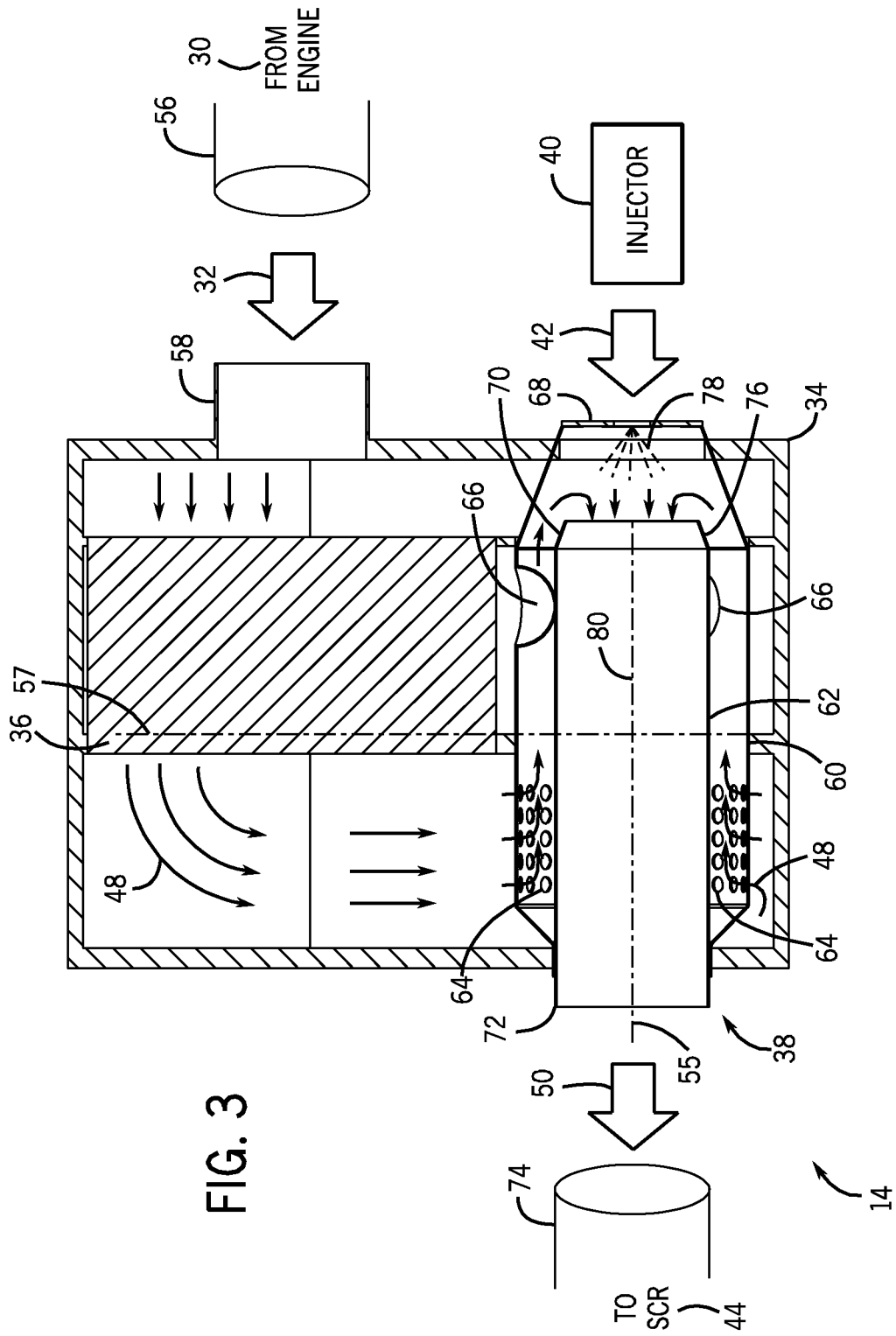
FIG. 3 is a cross-sectional view of an embodiment of a DOC assembly, which may be employed within the exhaust system of FIG. 1.

FIG. 3 is a cross-sectional view of an embodiment of a DOC assembly, which may be employed within the exhaust system 14 of FIG. 1. For reference, the mixer 38 has a longitudinal axis 55. Likewise, the DOC housing 34 has a longitudinal axis 57. As illustrated, the exhaust 32 flows from the engine 30 into the DOC housing 34 through an exhaust pipe 56 coupled to an intake conduit 58. In certain embodiments, the exhaust pipe 56 is coupled to the intake conduit 58 by a welded connection. However, in further embodiments, the exhaust pipe 56 is coupled to the intake conduit via another suitable connection, such as bolts, braces, clamps, or brackets, for example. The exhaust 32 passes through the DOC housing 34, and into the DOC 36. The DOC 36 oxidizes carbon monoxide and unburned hydrocarbons into water and carbon dioxide. The DOC 36 contains a suitable oxidizing catalyst (e.g., made from platinum group metals) in a honeycomb configuration, or any other suitable configuration, to facilitate exposure of the exhaust 32 to the catalyst in the DOC 36. Thus, the catalyzed exhaust 48 from the DOC 36 contains lower concentrations of hydrocarbons and carbon monoxide than the exhaust 32 from the engine 30. Additionally, from the DOC 36, the DOC housing 34 directs the catalyzed exhaust 48 toward the mixer 38.

In the illustrated embodiment, the mixer 38 includes an outer conduit 60, an inner conduit 62, multiple openings 64, protrusions 66, and an injection coupling 68. As illustrated, protrusions 66 are formed as part of the outer conduit 60, and are configured to support the inner conduit 62. Accordingly, the inner conduit 62 and the outer conduit 60 are connected by a slip joint near the distal end 70 of the mixer 38. Alternatively, the outer conduit 60 and the inner conduit 62 may be coupled by another suitable coupling (e.g., a welded connection). Additionally, the outer conduit 60 is coupled to the DOC housing 34 via a welded connection at the proximal end 72, and the inner conduit 62 is coupled to a pipe 74 via a welded connection. In certain embodiments, the outer conduit 60 and the inner conduit 62 may be coupled to one another, to the DOC housing 34, and/or to the pipe 74 by another suitable coupling, such as welded connections, bolts, brackets, or braces, for example.

Additionally, the injection coupling 68 provides a structure for delivering the DEF 42 from the injector 40 into the mixer 38. In certain embodiments, the injection coupling 68 may include a plate configured to receive bolts or screws for coupling the injector 40 directly to the injection coupling 68. In certain embodiments, the injection coupling 68 may couple to the injector 40 via an intermediate conduit. The injection coupling 68 may be coupled to the DOC housing 34 via suitable attachments, such as a welded connection. In some embodiments, the injection coupling 68 is not directly coupled to the DOC housing 34. In the illustrated embodiment, the injection coupling 68 is disposed on the exterior of the DOC housing 34. In alternative embodiments, the injection coupling 68 may be integrated with or disposed within the DOC housing 34.

As illustrated, the exhaust 48 enters into the mixer 38 through multiple openings 64 in a direction cross-wise to the longitudinal axis 55 of the mixer 38. In the illustrated embodiment, the mixer 38 includes five rows of openings, arranged in a uniform grid containing horizontal rows and vertical columns oriented perpendicularly to one another. In certain embodiments, the mixer 38 may include 1, 2, 3, 4, 5, or more rows of openings, arranged in any suitable configuration. For example, in certain embodiments, the openings may be arranged in rows neither perpendicular nor parallel to the longitudinal axis 55 of the mixer 38. Additionally, as illustrated, the openings 64 are circular, but certain embodiments may include openings of other suitable shapes, such as rectangular or triangular, for example. As the exhaust 48 enters through the openings 64, the exhaust 48 flows annularly through a passage between the inner and outer conduits toward the distal end 70 of the inner conduit 62. The exhaust 48 flows around a bevel 76 at the distal end of the inner conduit 62. The bevel 76 facilitates flow of the exhaust 48 around the distal end 70 and into the inner conduit 62. By aiding the flow of exhaust 48 around the distal end 70, the bevel 76 reduces backpressure in the exhaust system and increases the efficiency of the engine. Additionally, the bevel 76 establishes turbulence which enhances the efficiency and effectiveness of mixing of DEF 42 within the exhaust 48. By enhancing the mixing process, the exhaust system 14 reduces emissions as well as the amount of DEF 42 used in the exhaust system 14.

The flow of exhaust 48 mixes with a sprayed DEF 78 provided by the injector 40. The sprayed DEF 78 forms a mist distributed along the central axis 80 of the flow of exhaust 48 through the mixer 38. Therefore, the sprayed DEF 78 is distributed at least partially uniformly throughout the exhaust 48, thereby forming a well-mixed exhaust 50 with a substantially uniform distribution of sprayed DEF 78. As discussed above, the well-mixed exhaust 50 then exits the mixer 38 and DOC housing 34, and proceeds to the SCR module 46 for further catalytic reduction.

Figure 4:
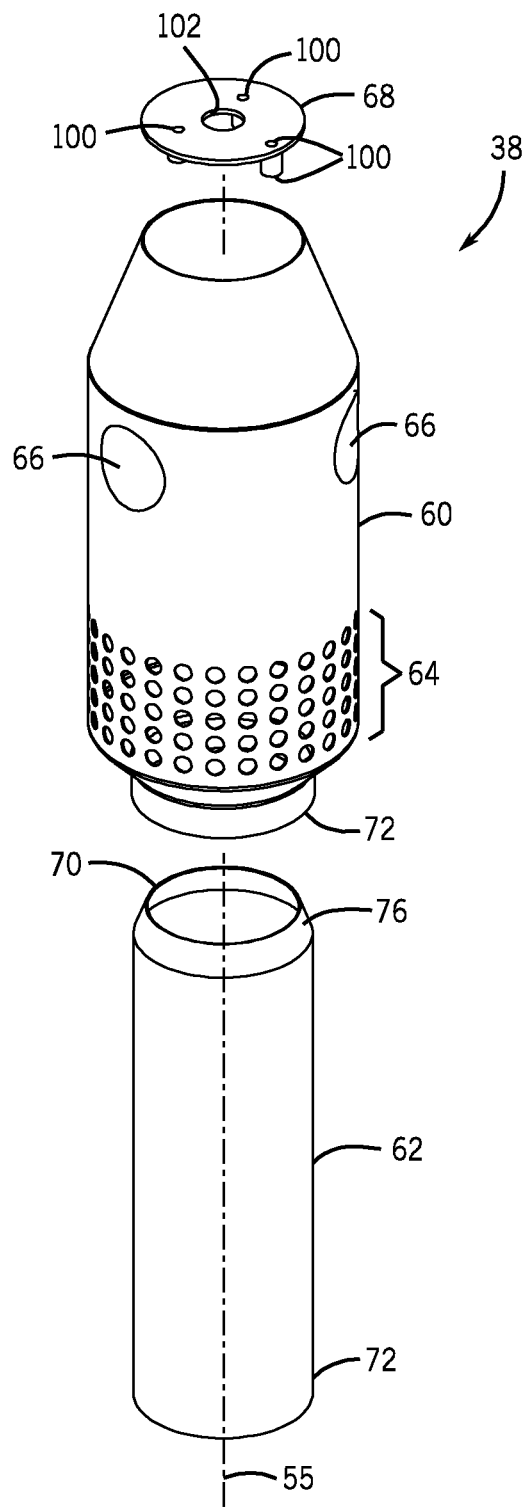
FIG. 4 is an exploded view of an embodiment of a mixer, which may be disposed within the DOC assembly of FIG. 3.
Figure 5:
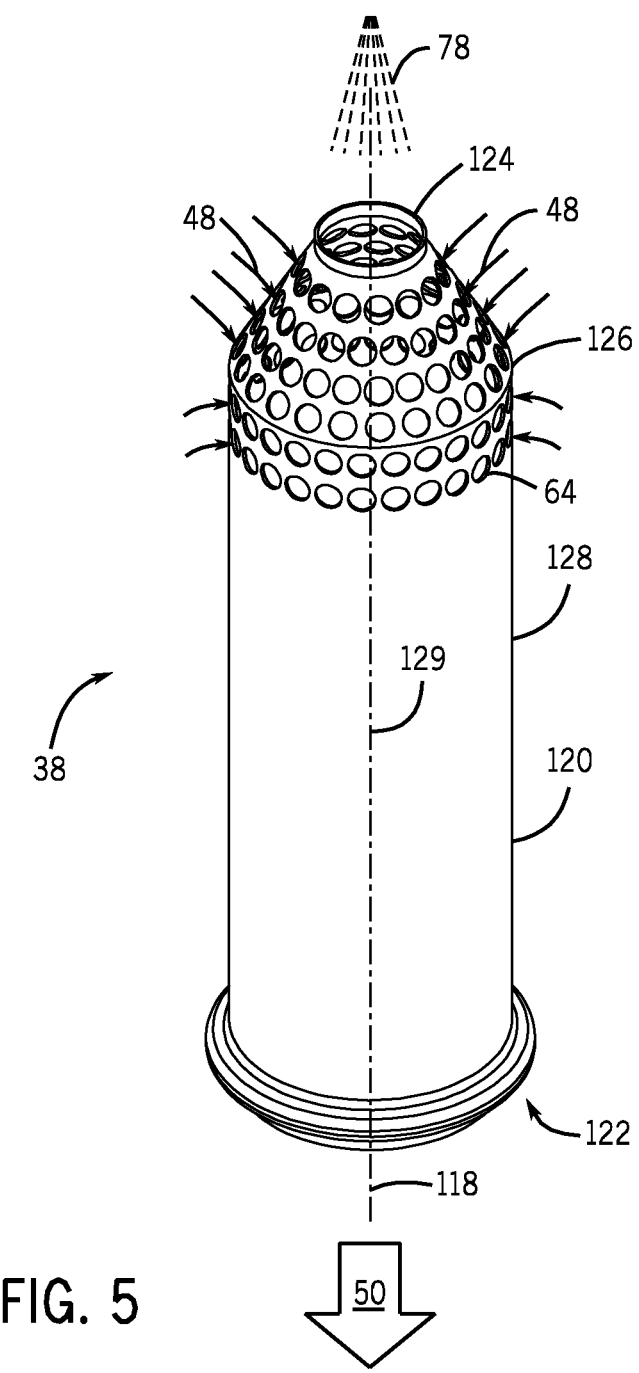
FIG. 5 is a perspective view of another embodiment of a mixer, which may be disposed within the DOC assembly.

FIG. 4 is an exploded view of an embodiment of a mixer 38, which may be disposed within the DOC assembly of FIG. 3. In the illustrated embodiment, the injection coupling 68 includes a plate having screw couplings 100. The screw couplings 100 enable the injector 40 to be coupled directly to the mixer 38. Alternatively, the screw couplings 100 may be used to couple to the injector 40 indirectly (e.g., through a conduit or hose). In certain embodiments, the injection coupling 68 may use another form of coupling for mounting the mixer 38 to the injector 40. For example, certain embodiments may omit the screw couplings 100 and/or include brackets, braces, welded connections, or another suitable coupling. Additionally, the injection coupling 68 includes an opening 102. The opening 102 enables the mixer 38 to receive sprayed DEF 78 from the injector 40 in order to mix the sprayed DEF 78 with the exhaust 48. As previously discussed, the sprayed DEF 78 is distributed at least partially uniformly throughout the exhaust 48, thereby forming a well-mixed exhaust 50 with a substantially uniform distribution of sprayed DEF 78. Further, the well-mixed exhaust 50 then exits the mixer 38 and DOC housing 34, and proceeds to the SCR module 46 for further catalytic reduction FIG. 5 is a perspective view of another embodiment of a mixer 38, which may be disposed within the DOC assembly. For reference, the mixer 38 has a longitudinal axis 118. The illustrated embodiment of the mixer 38 includes a single conduit 120. The proximal end 122 of the conduit 120 may be connected to the DOC housing 34 by any suitable attachment, such as a slip joint or welded connection. Alternatively, in certain embodiments, the proximal end 122 of the conduit 120 may be coupled to the pipe 74 in addition to, or instead of, being coupled to the DOC housing 34. Further, the distal end 124 of the conduit 120 may be coupled to an injection coupling 68. Additionally, the injection coupling 68 may be coupled directly to the DOC housing 34, or may be separate from the DOC housing 34. In addition, the mixer 38 includes multiple openings 64 configured to receive the exhaust 48. In the illustrated embodiment, the multiple openings 64 are arranged in a substantially uniform grid with six rows parallel to one another, and perpendicular to a longitudinal axis of the mixer 38. In certain embodiments, the mixer 38 may include 1, 2, 3, 4, 5, or more rows of openings in any suitable arrangement. For example, in certain embodiments, the openings may be arranged in rows neither perpendicular nor parallel to the longitudinal axis 118. Additionally, the illustrated openings 64 are circular, but some embodiments may include openings of other suitable shapes, such as rectangular or triangular, for example.

The mixer 38 receives the exhaust 48 from the DOC 36 of FIG. 3 in a direction cross-wise to the longitudinal axis 118. The exhaust 48 enters the distal end 124 of the conduit 120 through the multiple openings 64 in a cone 126 and/or openings 64 in a wall 128. The exhaust 48 enters into the mixer 38 to enable mixing of the sprayed DEF 78 with the exhaust 48. The sprayed DEF 78 is sprayed through an opening in the injection coupling 68 along a central axis 129 of the flow of the exhaust 48 through the mixer 38. By spraying along the central axis 129, the sprayed DEF 78 is mixed substantially uniformly with the exhaust 48 without spraying directly on the walls of the mixer 38. By spraying into the exhaust path rather than onto the wall of the mixer 38, the DEF 78 is less susceptible to crystallization. By reducing the susceptibility of crystallization of the sprayed DEF 78, the mixer 38 distributes more of the DEF 78 within the exhaust 48. Additionally, the multiple openings 64 in the cone 126 enables the exhaust 48 to enter into the mixer 38 with a velocity component along the central axis 129. This velocity component along the central axis 129 enables the sprayed DEF 78 to mix more uniformly with the exhaust 48. Furthermore, the velocity component along the central axis 129 reduces the pressure drop through the mixer 38. As previously discussed, reducing the pressure drop through the mixer 38 further reduces emissions from the exhaust system 14. The exhaust 48 mixes with the sprayed DEF 78 to supply a well-mixed exhaust 50 through the proximal end 122 of the conduit 120. The well-mixed exhaust 50 is then supplied to the SCR module 46 for further catalytic reduction.

Figure 6:
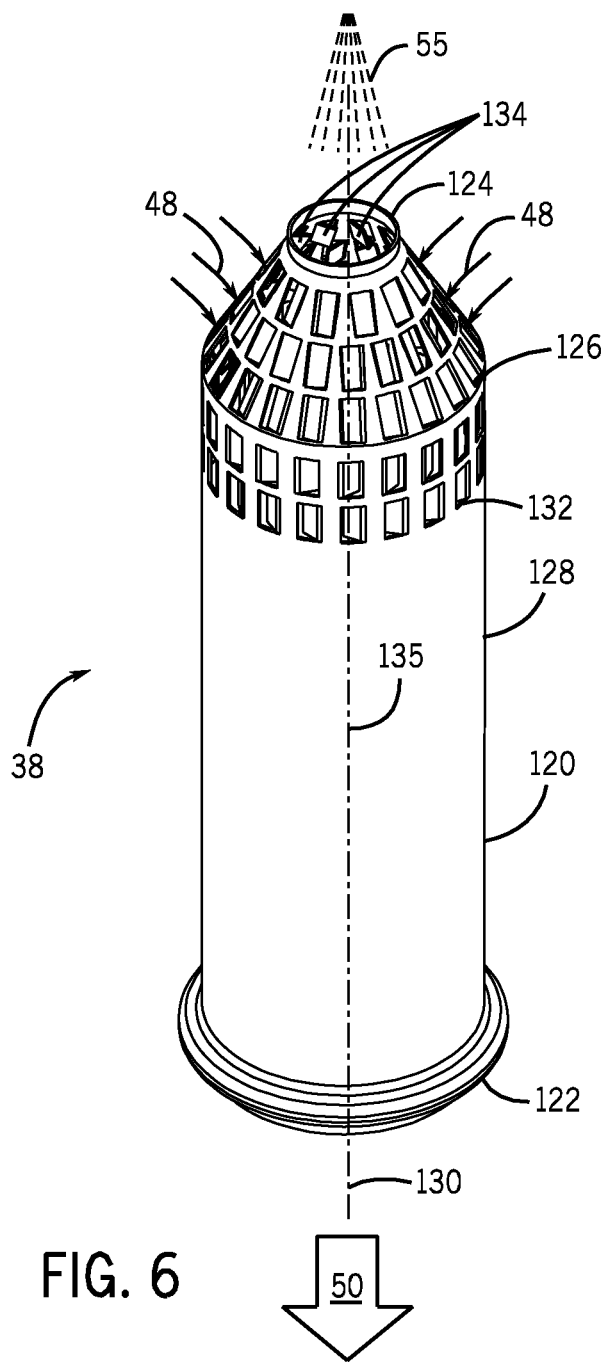
FIG. 6 is a perspective view of a further embodiment of a mixer, which may be disposed within the DOC assembly.

FIG. 6 is a perspective view of a further embodiment of the mixer 38, which may be disposed within the DOC assembly. For reference, the mixer 38 has a longitudinal axis 130. As previously discussed above, the conduit 120 may be coupled to the DOC housing 34. In the illustrated embodiment, the conduit 120 includes multiple louvered openings 132. As illustrated, the multiple louvered openings 132 are arranged in five parallel rows perpendicular to the longitudinal axis of the mixer 38. In certain embodiments, the multiple louvered openings 132 may be arranged in 1, 2, 3, 4, 5, or more rows. In addition, certain embodiments include multiple louvered openings 132 oriented in rows parallel to the longitudinal axis of the mixer 38. As illustrated, each louvered opening 132 includes a louver 134 extending radially into the conduit 120.

The exhaust 48 enters into the distal end 124 in a direction cross-wise to the longitudinal axis 130 of the mixer 38. The exhaust 48 may enter through openings 132 in a cone 126 and/or through openings 64 in a wall 128. The exhaust 48 enters into the mixer 38 to enable mixing of the sprayed DEF 78 with the exhaust 48. The sprayed DEF 78 is sprayed through an opening in the injection coupling 68 along a central axis 135 of the flow of the exhaust 48 through the mixer 38. The louvers 134 act as guides for directing the exhaust 48 in a desired flow pattern to enhance the efficiency of distributing the DEF 42 throughout the exhaust 48. Therefore, the louvers 134 cause the exhaust 48 to flow in a swirling pattern through the mixer 38. By spraying along the central axis 135 within the swirling flow, the DEF 42 is distributed in a substantially uniform distribution within the exhaust 48 to provide the well-mixed exhaust 50 to the SCR module 46 for further catalytic reduction. Additionally, the multiple openings 132 in the cone 126 enable the exhaust 48 to enter into the mixer 38 with a velocity component along the central axis 135. This velocity component along the central axis 135 allows the sprayed DEF 78 to mix more uniformly with the exhaust 48. Furthermore, the velocity component along the central axis 135 reduces the pressure drop through the mixer 38. As previously discussed, reducing the pressure drop through the mixer 38 further reduces emissions from the exhaust system 14.

Figure 7:
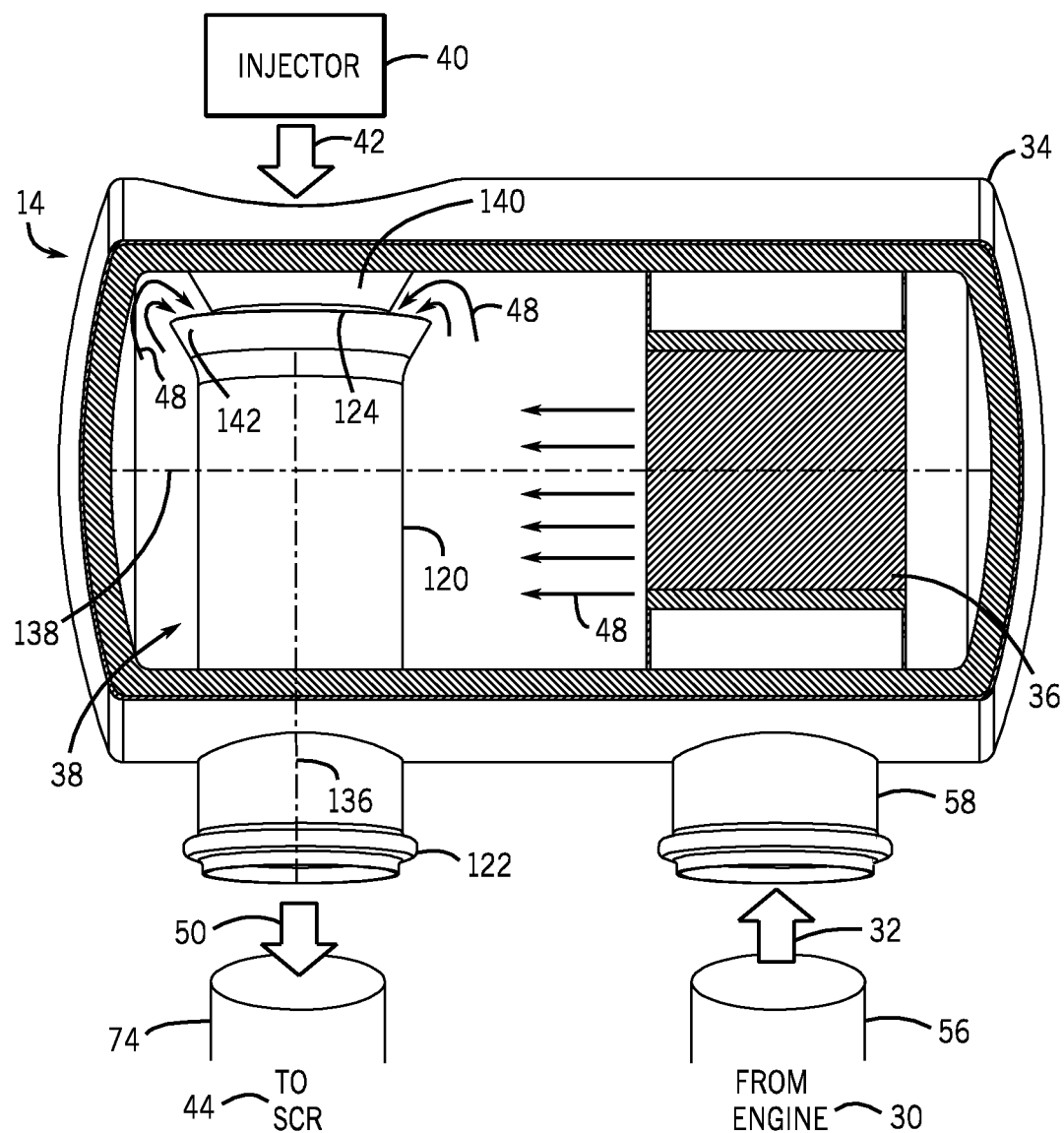
FIG. 7 is a cross-sectional view of another embodiment of a DOC assembly, which may be employed within the exhaust system of FIG. 1.

FIG. 7 is a cross-sectional view of another embodiment of a DOC assembly, which may be employed within the exhaust system 14 of FIG. 1. For reference, the mixer 38 has a longitudinal axis 136. Likewise, the DOC housing 34 has a longitudinal axis 138. The illustrated embodiment includes the mixer 38 and a DOC 36 disposed within a DOC housing 34. The longitudinal axis 136 of the mixer 38 is perpendicular to the longitudinal axis 138 of the DOC housing 34. Alternatively, the mixer 38 may be disposed within an SCR housing 44, upstream of an SCR module 46 along the exhaust flow path. An engine 30 provides exhaust 32 to the exhaust system 14 through the exhaust pipe 56. The exhaust 32 enters the DOC housing 34 through the intake conduit 58, which is coupled to the exhaust pipe 56. The exhaust 32 then flows through the DOC 36. As previously discussed, the DOC 36 provides an oxidization catalyst to facilitate the oxidization of unburned hydrocarbons and carbon monoxide. The oxidization of unburned hydrocarbons and carbon monoxide in the DOC 36 converts the hydrocarbons and carbon monoxide into water and carbon monoxide. Thus, the exhaust 48, which contains reduced amounts of hydrocarbons and carbon dioxide, flows toward the mixer 38.

The mixer 38 includes a conduit 120, a protrusion 140 extending into the conduit, and a flared portion 142 of a distal end 124 of the conduit 120. The proximal end 122 of the conduit may be coupled to the pipe 74 and/or the DOC housing 34 by a suitable attachment, such as a welded connection, slip joint, bracket, or clamp. As discussed in detail below, the protrusion 140 extends from the DOC housing 34, and at least partially engages the flared portion 142 of the conduit 120 creating an annular opening between the flared portion 142 and the protrusion 140. Further, the protrusion 140 is configured to receive the DEF 42 from the injector 40. The exhaust 48 flows toward the distal end 124 of the conduit 120, and enters the conduit 120 through the flared portion 142 as an annular flow through the annular opening between the protrusion 140 and the flared portion 142. As discussed below, within the conduit 120, the exhaust 48 is combined with sprayed DEF 78 to form well-mixed exhaust 50. The well-mixed exhaust 50 is then supplied to the SCR module 46 through the pipe 74.

Figure 8:
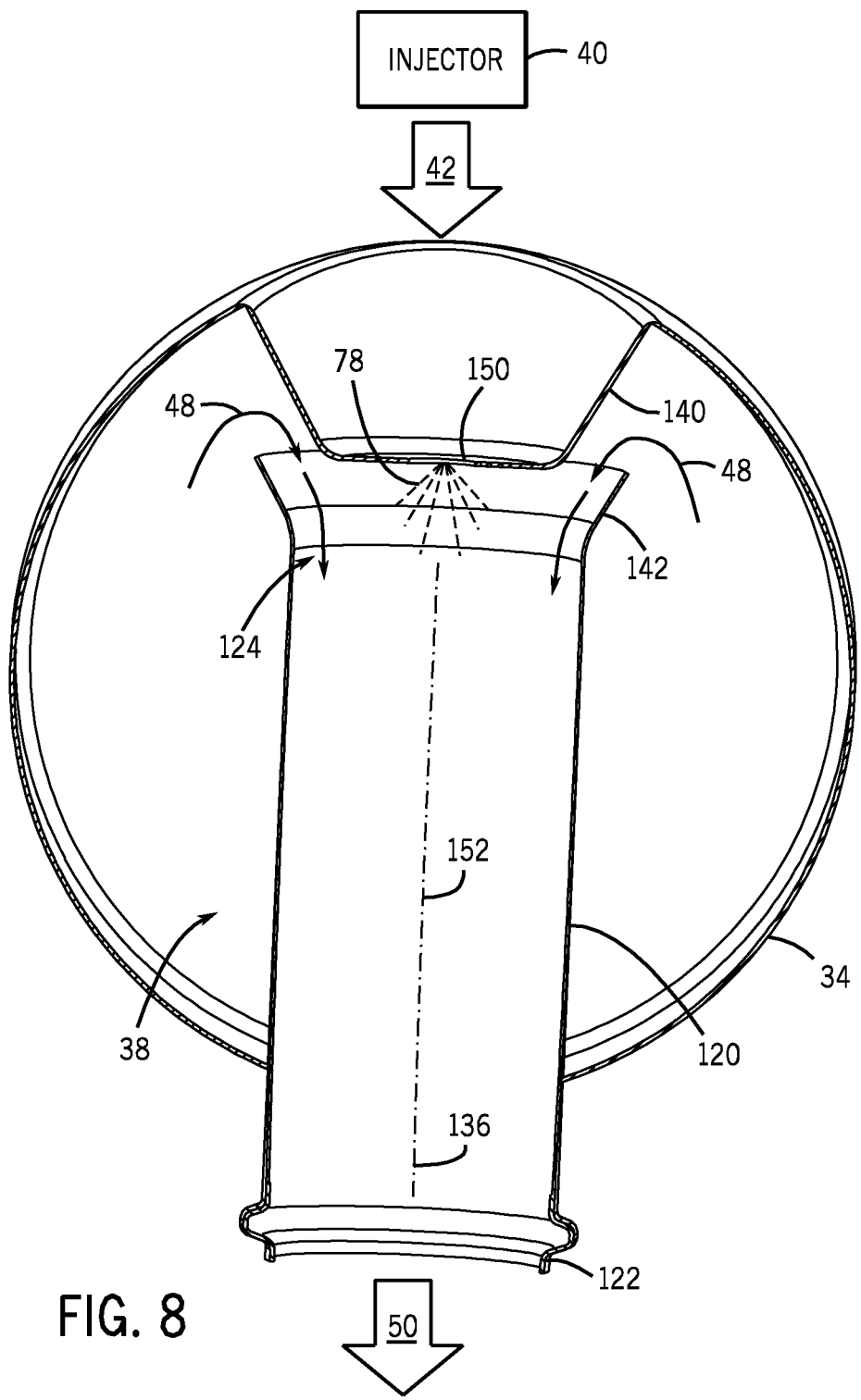
FIG. 8 is a cross-sectional view of an embodiment of a mixer, which may be employed within a DOC assembly.

FIG. 8 is a cross-sectional view of the mixer 38, which may be employed within a DOC assembly. The mixer 38 includes a conduit 120, a protrusion 140 extending from the DOC housing 34 into the conduit 120, and a flared portion 142 at a distal end 124 of the conduit 120. As illustrated, the protrusion 140 extends at least partially into the flared portion 142 of the distal end 124 of the conduit 120. Additionally, the protrusion 140 includes an opening 150 configured to receive the DEF 42 from an injector 40. In certain embodiments, the injector 40 directly couples to the DOC housing 34 at the opening 150. Alternatively, the injector 140 may be indirectly coupled to the opening 150 by an intermediary conduit.

The exhaust 48 flows in a direction cross-wise to the DEF flow and changes direction as it enters the annular opening, thereby establishing a turbulent flow that facilitates mixing of the exhaust 48 with the DEF 42 to create a well-mixed exhaust 50. By mixing the DEF 78 in a turbulent flow, the mixing of the DEF 78 is enhanced, thereby reducing emissions and the amount of DEF 42 used in the exhaust system 14. The injector 40 sprays DEF 42 through the opening 150 into the annular flow of exhaust 48 along a central axis 152 of the flow of the exhaust 48 through the mixer 38. By delivering the sprayed DEF 78 along a central axis 152 of the exhaust flow, the sprayed DEF 78 mixes with the exhaust 48 to create well-mixed exhaust 50. Additionally, because the protrusion 140 is oriented at an obtuse angle to the flow of exhaust 48, the pressure drop through the mixer 38 is reduced. As previously discussed, reducing the pressure drop through the mixer 38 further reduces emissions from the exhaust system 14. As discussed above, the well-mixed exhaust 50, which includes a substantially uniform mixture of exhaust 48 and the sprayed DEF 78, reacts in the presence of the heat from the exhaust 48 and the exhaust system 14, thereby undergoing thermal decomposition and hydrolysis to create ammonia and water within the well-mixed exhaust 50. The well-mixed exhaust 50 is supplied to the SCR module for further catalytic reduction.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.)) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An exhaust system for an agricultural vehicle comprising:
   a mixer comprising:
   an outer conduit having a plurality of openings configured to receive a flow of exhaust gas along a direction cross-wise to a longitudinal axis of the mixer;
   and an inner conduit that receives a spray of diesel exhaust fluid through a distal end of the inner conduit along the longitudinal axis of the mixer during operation of the exhaust system;
   wherein the diesel exhaust fluid comprises an aqueous urea solution; and the outer conduit is disposed about the inner conduit, and configured to direct the flow of exhaust gas from the openings toward the distal end of the inner conduit to mix the spray of diesel exhaust fluid with the exhaust gas; and the inner conduit is configured to discharge the exhaust gas along the longitudinal axis of the mixer.

2. The exhaust system of claim 1, wherein the outer conduit comprises protrusions configured to support the inner conduit.

3. The exhaust system of claim 2, wherein the protrusions form a slip joint with the inner conduit.

4. The exhaust system of claim 1, comprising an injector configured to spray the diesel exhaust fluid into the mixer along the longitudinal axis.

5. The exhaust system of claim 1, comprising a housing disposed along an exhaust path, wherein the mixer is disposed within the housing, and the longitudinal axis of the mixer is perpendicular to a longitudinal axis of the housing.

6. The exhaust system of claim 5, wherein the housing encloses a diesel oxidation catalyst or a selective catalytic reduction module.

7. The exhaust system of claim 5, wherein the outer conduit is coupled to the housing via a welded connection.

8. An exhaust system for an agricultural vehicle comprising:
   a housing configured to receive a flow of exhaust gas;
   a mixer configured to receive a spray of diesel exhaust fluid along a longitudinal axis of the mixer, and to receive the flow of exhaust gas from the housing along a direction cross-wise to the longitudinal axis of the mixer, wherein the mixer comprises:
   a conduit having a flared portion at a distal end;
   a protrusion having an opening, wherein the protrustion is positioned adjacent to the flared portion and extends from an interior of the housing into the flared portion to establish an annular orifice between the protrusion and the flared portion;
   wherein the flared portion is configured to receive the spray of diesel exhaust fluid through the opening, and to receive the flow of exhaust gas through the annular orifice, and the conduit is configured to discharge the exhaust gas along the longitudinal axis of the mixer.

9. The exhaust system of claim 8, comprising an injector configured to spray the diesel exhaust fluid along a longitudinal axis of the mixer.

10. The exhaust system of claim 8, comprising a selective catalytic reduction module configured to receive the flow of exhaust gas from the mixer.

11. The exhaust system of claim 8, wherein the diesel exhaust fluid comprises an aqueous urea solution.

* * * * *